United States Patent
Hayes, Jr.

[15] 3,668,056

[45] June 6, 1972

[54] INTEGRAL MICROPOROUS ARTICLE AND PROCESS OF MAKING

[72] Inventor: Stanley I. Hayes, Jr., Hamilton, Mass.

[73] Assignee: USM Corporation, Flemington, N.J.

[22] Filed: Dec. 12, 1969

[21] Appl. No.: 884,571

[52] U.S. Cl.................................161/159, 2/168, 36/46.5, 161/88, 161/190, 260/2.5 AY, 264/45, 264/53, 264/244, 264/257, 264/310, 264/328, 264/DIG. 62, 264/DIG. 77

[51] Int. Cl. .....................................B29d 27/04, B32b 3/26

[58] Field of Search...............264/41, 49, 305, 244, 54, 310, 264/325, 328, 299, 301, 257; 260/2.5 AY; 161/159, 88, 190; 2/168; 36/46.5

[56] References Cited

UNITED STATES PATENTS

| | | | |
|---|---|---|---|
| 2,434,035 | 1/1948 | Delaney et al. | 264/305 X |
| 3,000,757 | 9/1961 | Johnston et al. | 264/41 UX |
| 3,302,243 | 2/1967 | Ludwig | 264/244 X |
| 3,348,963 | 10/1967 | Fukushima et al. | 264/41 UX |
| 3,369,925 | 2/1968 | Matsushita et al. | 264/41 UX |
| 3,413,184 | 11/1968 | Findlay et al. | 264/41 UX |
| 1,941,193 | 12/1933 | Wells et al. | 264/325 |
| 2,958,907 | 11/1960 | Mumford et al. | 264/310 X |
| 3,287,486 | 11/1966 | Jurgeleit et al. | 264/325 |
| 3,432,581 | 3/1969 | Rosen | 264/310 X |
| 3,485,903 | 12/1969 | Findlay et al. | 264/41 |
| 3,539,388 | 10/1970 | Shu-Tung Tu | 264/41 X |
| 3,539,389 | 10/1970 | Shu-Tung Tu | 264/41 X |
| 3,565,982 | 2/1971 | Day | 264/41 X |
| 3,293,338 | 12/1966 | Voelker | 264/301 X |
| 3,382,138 | 5/1968 | Barth | 2/168 X |
| 3,436,781 | 4/1969 | Becka et al. | 264/244 X |

FOREIGN PATENTS OR APPLICATIONS

| | | | |
|---|---|---|---|
| 733,889 | 5/1966 | Canada | 264/54 |

*Primary Examiner*—Philip E. Anderson
*Attorney*—Richard A. Wise, Richard B. Megley and Benjamin C. Pollard

[57] ABSTRACT

A one-piece microporous clothing article such as a shoe upper or glove is formed by molding a solidifiable liquid emulsion of fine droplets of an organic liquid in a continuous phase comprising reactive material convertible through reaction to solidified resilient condition. The emulsion is caused to gel and solidify with said droplets held in the solidified material, the solidified material in the form of a shoe upper or glove is removed from engagement with the molding surface and the liquid is removed without expanding the solidified material leaving pores and discontinuities in the solidified material to constitute passageways for air and vapor.

18 Claims, 5 Drawing Figures

*Inventor*
Stanley I. Hayes, Jr.
By his Attorney
Benjamin C. Pollard

INTEGRAL MICROPOROUS ARTICLE AND PROCESS OF MAKING

This invention relates to the manufacture of clothing articles such as shoes and gloves and particularly to the molding of a one-piece preformed shoe upper or glove.

Traditionally the manufacture of shoes and gloves has involved securing together a number of pieces of flat material such as leather and fabric. Shoes are then shaped stretching the assembly over a form such as a last to bring it to a three dimensional curved shape. The method is time consuming and expensive and imposes requirements on the shoe upper material which have no direct relation to the ability of the material to function in the completed shoe. The stretching of material is acceptable for leather because leather is made of three dimensionally arranged fibers which retain strong interengagement during and after stretching. On the other hand leather substitutes are usually made up of a wear resistant decorative outer layer of resilient polymeric material and one or more inner or backing layers of woven or nonwoven fabric. When stretched as in lasting, the fibers of the fabric are rearranged to accommodate the new contour; but the outer layer is simply thinned out so that its surface appearance is altered. In many cases the outer layer loses its ability to mask the texture of the fabric backing with which it is associated. Since the outer layer is resilient, tensile stresses remain in it which promote cracking and cut growth.

It has been suggested, see U.S. patent to Phillips No. 2,904,838 of Sept. 22, 1959, that a preformed shoe upper be molded of thermoplastic material. Molded rubber or plastic gloves are also known. However, a shoe or glove so molded is not permeable to air or water vapor. Also thermoplastic materials in general lack the resistance to heat and to attack by chemicals and solvents which may be encountered in use of a shoe or glove.

It is an object of the present invention to form an integral microporous elastomeric shoe upper or glove without the necessity for assembling a number of pieces and without the necessity of stretching the material around a form.

It is a further object to provide a microporous shoe upper or glove which is resistant to heat and attack by chemicals and solvents.

To these ends and in accordance with a feature of the present invention a layer of a liquid material solidifiable to an elastomeric microporous body is formed against a molding surface complementary to the contour of the shoe upper or glove to be produced and is converted to a solid microporous condition possessing properties fitting it for use as a shoe upper or glove.

It is a further feature to provide a microporous shoe upper or glove of at least partially cross-linked elastomeric material giving resistance to heat, chemical and solvent damage.

The invention will be described in connection with the attached drawings in which.

Figure 4:
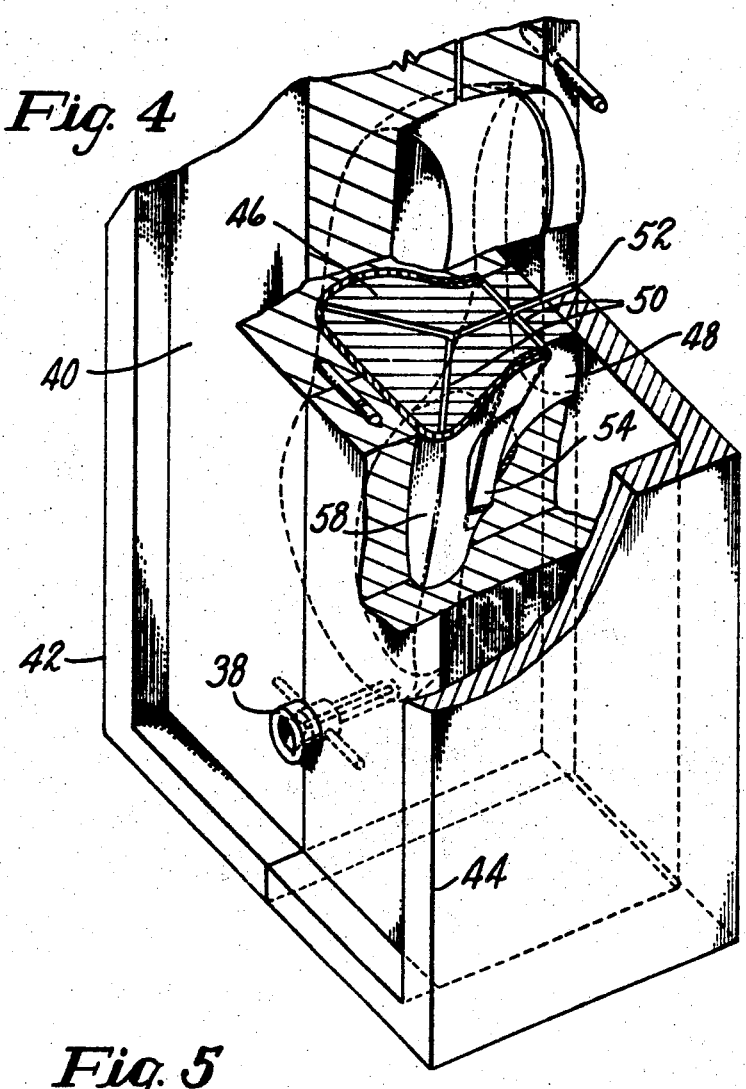
Figure 5:
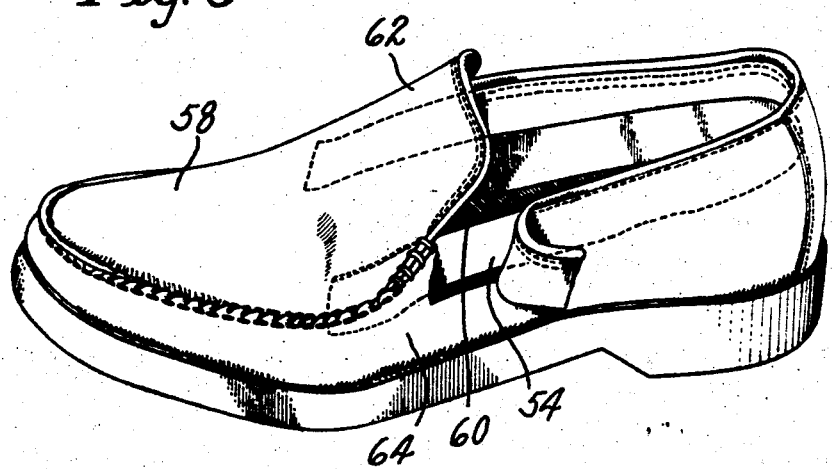

FIG. 4 is an angular elevational view of the forward part of another form of shoe mold for forming a shoe upper, the mold being partially broken away to show a shoe upper formed in the mold and to indicate the disposition of a reinforcement for integral combination with the shoe during molding; and FIG. 5 is an angular view of a completed shoe including the molded upper of FIG. 4 with a portion peeled back to show the location of the reinforcement in the shoe.

The process of the present invention will be described as it is practiced in the manufacture of shoes; but, it is to be understood that the procedures described are also applicable to the manufacture of other microporous molded articles such as gloves.

Shoes or shoe uppers and gloves are made according to the present invention by casting or molding a liquid composition reactive to form a tough flexible microporous unitary body with the contour and with the surface conformation of a shoe, shoe upper or glove. The composition of the liquid and the conditions of casting or molding are selected to retain fluidity during introduction of the liquid material into a mold to enable the material to conform to finer detail and thereafter to set up in a usefully short time to shape retaining condition enabling removal from the mold.

The liquid composition for molding into a shoe, shoe upper or glove is an emulsion including controlled size droplets of liquid dispersed in a continuous phase of reactive, preferably polymeric material convertible through reaction to a tough flexible solid. The dispersed liquid is selected to have no, or only very limited solvent or swelling action on the polymeric material. When the continuous phase solidifies, the droplets are held in dispersed condition and are thereafter removed as by evaporation leaving microporous pores or passageways.

The preferred reactive materials are those for forming tough, flexible high strength polyurethane or polyurea reaction products. The reactive material may be a "one shot" mixture of an organic compound having at least two active hydrogens such as a polymeric polyol, e.g. polyalkylene ether polyol and/or polyester polyol, with a reactive compound having at least two reactive —NCO groups, e.g. a polyisocyanate, or may be a prepolymer system in which an —NCO terminated reaction product of polyol with excess polyisocyanate, is combined with chain extenders which may be a polyhydroxy and/or polyamine compound. The reactive material must be either a liquid or reducible to a liquid.

Polyols useful in the "one shot" mixture or for forming the reactive prepolymer include substantially linear or only moderately branched polyether polyols, and substantially linear or moderately branched polyester polyols from polymerization of lactones or from the condensation of polybasic acids, e.g. adipic acid, sebacic acid, azelaic acid, dimerized linoleic acid and other aliphatic and aromatic dibasic acids with polyols such as butane diol, ethylene glycol, propylene glycol and the like. Castor oil is also a suitable polyol for making a prepolymer. Polyols or polybasic acids having more than two reactive OH or —COOH groups may be included in the compositions reactive to form polyester polyols to introduce moderate branching or cross linking and thus provide greater resistance to heat and solvents. As little as one half percent by weight of such polyols or polybasic acids having more than two reactive OH or —COOH groups will give marked increase in these properties and as much as 20 percent may be used.

Prepolymers are made by well understood procedures involving reaction of the polyether polyols or the polyester polyols with organic polyisocyanates including the toluene diisocyanates, methylene diisocyanates and the like. A proportion of polyisocyanate material having more than two reactive isocyanate groups may be included to provide a desired extent of cross linking. Where the polyol material is difunctional as little as one half percent of polyisocyanate containing more than two —NCO groups will give marked improvement in heat and solvent resistance and up to 20 percent may be used. Where the polyol material includes components having more than two reactive hydrogens the cross linking effects seem to be additive and the sum of the percentage of isocyanate having more than two —NCO groups and the percentage of compounds having more than two reactive hydrogens ordinarily should not exceed about 20 percent.

The action of the non-solvent pore-forming liquid is primarily physical, that is, the non-solvent liquid is a readily removable space filler which is present as dispersed droplets until the coating at least partially solidifies around the droplets and is removed thereafter leaving open spaces and pores. Removal is effected without expansion of the solidified body. Suitable liquids may readily be selected by a chemist on the basis of the known physical properties of liquids. Any liquid having substantial non-solvency and non-reactivity with the polymeric material together with suitable volatility characteristics may be used. Normally liquid aliphatic hydrocarbons including petroleum hydrocarbon fractions, particularly those commercially available as mineral spirits, petroleum naphtha and kerosene which are largely or completely aliphatic in composition are generally preferred because of their low cost and satisfactory behavior in the composition; but other substantially inert organic liquids such as liquid alkyl ethers, e.g. amyl ether or butyl ether and liquid halogenated hydrocarbons, preferably halogenated aliphatic hydrocarbons such as chlorodecane, tetrachloroethylene and tetrachlorodifluoroethane may be used. To avoid premature evaporation so that it can serve its space filling function until the continuous phase has solidified, the pore-forming liquid is chosen to have a boiling point above the selected reaction temperature and should preferably have a boiling point of at least about 100°C. and preferably at least 130°C. to allow use of temperatures giving a desirable rate of reaction of the polymeric material. On the other hand the liquid will be chosen with low enough boiling point for removal without heat injury to the solidified material. Thus the liquid should ordinarily not contain substantial quantities of high boiling or low volatility components, and preferably at least 90 percent of the components of the liquid will boil at temperatures under 232°C. It is to be understood that other means than evaporation, e.g. extraction may be used to remove high boiling or low volatility liquid and in such cases the upper limit of boiling point does not apply.

Dispersion of droplets of the pore-forming liquid in the liquid body of reactive polymeric material to form an emulsion in which the reactive polymeric material is the continuous phase, is effected by vigorous agitation during the course of addition of the poreforming liquid to the body of polymeric material. Emulsifying agents are useful to aid in dispersing the liquid in the polymeric material and to stabilize the resulting emulsion. The selection of emulsifying agents is readily made by a chemist acquainted with the techniques of emulsion forming. Preferred emulsifying agents have included anionic and non-ionic surface active agents such as commercially available silicone emulsifiers, partial long chain fatty acid esters and the polyoxyalkylene derivatives of such esters, also sulfuric acid esters of long chain fatty alcohols, etc.

The amount of pore-forming liquid dispersed will vary with the desired porosity of the final product and may vary from as low as 25 parts of the liquid to 100 parts of the polymer up to as high as 300 parts of the liquid to 100 parts of the polymer material. It is desirable that the mechanical conditions of dispersion of the liquid and the polymer be controlled to form very small droplet sizes of which the majority will be in the range of from about 0.001 mm to about 0.03 mm. in diameter.

Reaction of the polymeric material to higher molecular weight solid condition is brought about and controlled by the time and temperature conditions of bringing together of the reactive components and/or by the introduction of catalyst. In the one step process in which a polymeric polyol such as the polyether polyol or polyester polyol is reacted with a polyisocyanate, mixing and emulsification involves bringing together these materials together with the liquid to be dispersed and a catalyst, such as stannous octoate or lead naphthenate, effective to control the reaction rate. It will be understood that where reaction occurs at so fast a rate that it is difficult to complete the emulsion before excessive increase in viscosity or solidification of the polymeric material takes place, the pore forming liquid may be emulsified in one of the reagents usually the polyether or polyester polyol before combination with the polyisocyanate In the two step process, an —NCO terminated prepolymer prepared from a polymeric polyol such as hydroxyl terminated polyether or polyester and a polyisocyanate, the pore forming liquid, and chain extenders reactive with the prepolymer to give higher molecular weight materials are combined and emulsified with the prepolymer material forming the continuous phase. Chain extenders effective to increase the molecular weight of the prepolymer are compounds having two or more active hydrogen atoms such as p,p'—methylene—dianiline, 4,4'—methylene—bis—(2,-chloro-aniline), trimethylolpropane, m—phenylediamine, 1,4—butane diol and triethanolamine.

The liquid reactive emulsion may be cast as a shoe upper by various procedures including procedures resembling "rotational" molding, "squeeze" molding and injection molding. The molding or casting of liquid low viscosity reactive emulsion does not require high temperatures or pressures and molds may be made of any of a wide variety of materials including metals, rigid plastics such as reinforced epoxy resin, elastomers such as silicone rubber, polyurethane elastomers and so on. With many of these a release surface such as a silicone, or a fluorocarbon will be desirable. It has also been found that a desirable surface character, e.g. a color or a high gloss may be provided by depositing finishing material, for example, by spraying, on the interior of the mold before introducing the reactive emulsion into the mold. On solidifying and curing of the reactive material the finish will be integrally joined to the main body of material. Such finish material may be a pigmented solution, dispersion or latex of resin with which the reactive material will combine chemically or will adhere to strongly. Preferred materials are those which give a water vapor permeable, preferably microporous surface, for example, a dispersion of pigment in reactive emulsion similar to that of the body of molding material or solutions or latices of hydrophilic resins or plastics such as copolymers of acrylic acid with a lower alkyl acrylate, or cellulose derivatives.

Figure 1:
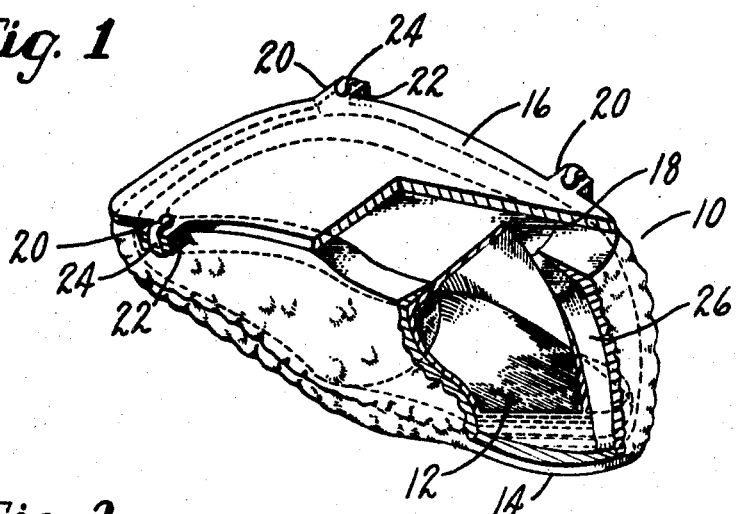
FIG. 1 is an angular view with parts broken away showing a mold with a partially formed shoe upper on the walls of the mold together with additional solidifiable liquid material for completing the shoe upper.

In the "rotational" molding procedure there is used a metal mold 10 of which the interior is complementary to the desired contour and exterior surface of a shoe upper (see FIG. 1). The area of the normal ankle opening is blocked by a wall 12 extending across from portions 14 corresponding to the upper edge of the shoe upper of the mold; and a removable closure member 16 is provided for an opening 18 in the mold at the portion corresponding to the shoe bottom. As shown in FIG. 1, ears 20 at the edges of the closure member 16 are arranged to coincide with the ears 22 on the mold 10 when the closure member and mold are assembled and holding devices such as spring clips 24 are provided to hold the closure member 16 in sealing engagement with the mold.

With the closure member 16 removed, and the mold 10 disposed with the bottom opening 18 uppermost, a measured quantity of the liquid reactive emulsion is introduced into the mold, the closure member 16 is put in place and the spring clips 24 are applied to hold the member in place. The mold is then slowly rotated about its longitudinal and transverse axes to cause the liquid emulsion to flow by gravity over the total surface of the mold. This rotation may be carried out in a temperature controlled chamber. Reaction of the reactive components of the emulsion increases the viscosity of the emulsion and builds up a gelled layer 26 smoothly covering the interior walls of the mold 10. When the emulsion has gelled, rotation may be stopped and the reaction allowed to proceed to develop strength in the layer sufficient for handling. Final cure of the gelled layer as a cast shoe upper 30 may be completed before or after removal from the mold 10. The closure member 16 is removed and a cast upper 30 is pulled out of the mold 10. The material at the portions corresponding to an ankle opening 32 and a shoe bottom 34 of the shoe upper 30 is cut out; and liquid of the dispersed droplets is removed as by evaporation leaving microporous openings in passageways through the cast shoe upper.

Figure 2:
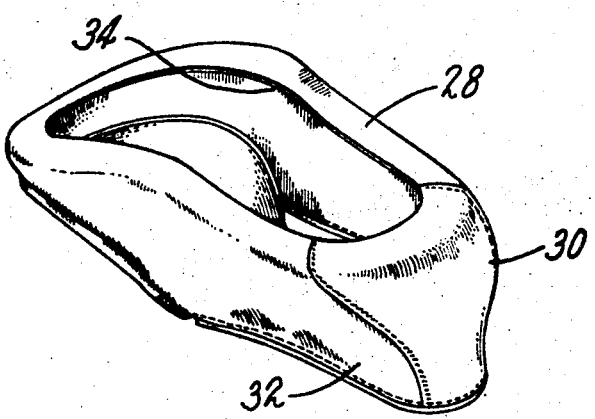
FIG. 2 is an angular view of a shoe upper formed in the mold after cutting ankle and bottom openings.
Figure 3:
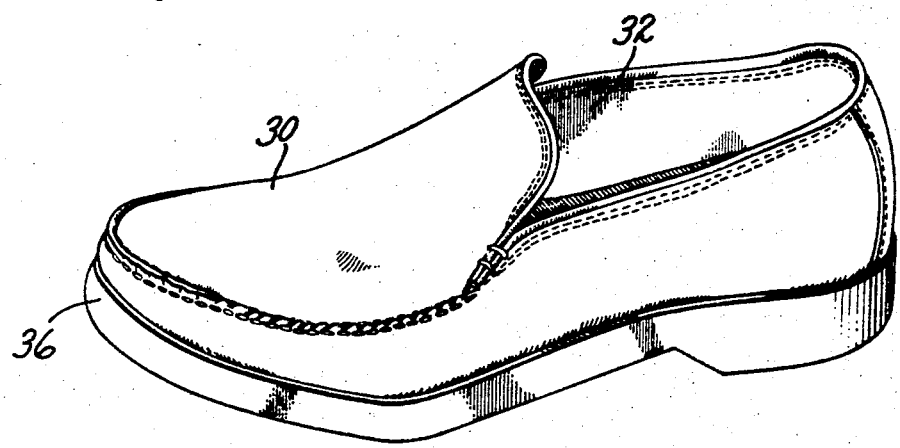
FIG. 3 is an angular view of a completed shoe incorporating the molded shoe upper.

As shown in FIG. 2, the cutting out of material from the shoe bottom leaves a sole attaching margin 28. The shoe is completed by securing an outsole 36 to the sole attaching margin 28 as by conventional cementing procedures or by molding or casting a sole directly onto the shoe upper 30.

In an alternative molding procedure liquid reactive emulsion is injected through passageway 38 into a split mold 40 which may have an interior surface comparable to the mold used in the first procedure but made in two parts 42 and 44 which are brought together to form a closed chamber as shown in FIG. 4, and which are separable for removal of a molded shoe. A mold core 46 with an exterior surface corresponding to the desired interior surface of the shoe is mounted within the split mold 40 with the surfaces of core 46 spaced from the interior surfaces of the mold 40 to provide a mold cavity of the desired thickness dimension. In a preferred form the mold core 46 is of a size and shape that the distance between its surface and the molding surface of the split mold 40 is greater in selected areas to give a greater thickness in corresponding areas of the shoe upper for greater strength and/or stiffness. The mold core 46 is held in desired relation to the split mold 40 portion by a locating plug 48. Vent holes 50 extend from the surface of the mold core 46 to an opening 52 to allow escape of air displaced when liquid to be molded is introduced into the mold 40. Means (not shown) may be provided for foreshortening the mold core 46 to aid in removal of the molded shoe. Also heating means such as electrical heaters (not shown) may be provided in the core to aid in evaporating the non-solvent liquid from a shoe upper after separation of the mold parts 42 and 44.

Reinforcing members 56 may be molded in place in a shoe upper 58 to provide extra strength at points of localized stress such as at the joint 60 between the tongue 62 and the vamp 64 of the shoe. These reinforcements may be, for example, tough woven or nonwoven fabric and may be mounted on the mold core 46 as shown in FIG. 4. Any convenient mounting means may be used such a s retractable pins (not shown) or a weak adhesive to hold the reinforcing members in place during filling of the mold. All-over reinforcement may be provided by disposing a sock-like member, which may be a stretchable, for example, knitted, fabric on the mold core. In this case, the grip of the sock-like member on the mold core may render the use of auxiliary mounting means unnecessary.

Solidifiable liquid to be molded into a shoe is introduced into the molding space through the passageway 38 extending through the wall of the split mold 40. Because of the low viscosity of the solidifiable liquid, very little pressure is required for filling the mold. For example, 2 lbs. per sq. inch gauge pressure has been found satisfactory.

After filling, the mold 40 is kept closed while the liquid is solidified. The parts 42 and 44 of the split mold 40 are then separated from the molded shoe upper, the mold core 46 foreshortened if a foreshortening device is provided and the molded shoe upper 58 removed from the mold core 46. The nonsolvent liquid of the dispersed droplets may be evaporated from the solidified material after separation of the mold parts 52 and 44 from the molded upper either before or after the upper is removed from the mold core 46, and the shoe completed as in the first described procedure. The reinforcing members 54 are firmly joined to the molded microporous portions of the shoe to resist stresses encountered in use of the shoe.

Squeeze molding is a procedure (not illustrated) in which liquid molding material is poured into a mold cavity and mold core is pressed into the cavity causing the liquid to be displaced up into the space between the mold core and the molding surface. In this case the liquid emulsion is solidified, the molding surface removed from the solidified material, non-solvent liquid of the dispersed droplets is removed and the shoe is completed as in the procedure involving injection of the reactive emulsion into a mold. This procedure is made possible by the very low viscosity of the molding material and is of particular advantage because it requires very little equipment for the molding of shoe shapes.

The following examples are given as of possible assistance in understanding the invention. It is to be understood that the invention is not restricted to the particular materials, conditions or procedures set forth in the examples.

Example I 150 grams of —NCO terminated prepolymer prepared by reaction of p,p'-diphenylmethane diisocyanate and hydroxyl terminated polybutylene adipate in a mol ratio of 2:1, the resulting prepolymer having a molecular weight of 1540, and being a solid at room temperature was liquefied and degassed at 100°C. and mixed with 4.5 grams of a polyoxyalkylene ether having a hydroxyl number of 20 which is a solid at 25°C. and the mixture was brought to a temperature of 70°C. 172 cc. of a liquid paraffinic hydrocarbon mixture (boiling range 346°F. to 405°F.) was emulsified into the resulting hot mixture. Thereafter, 9.23 grams of 1,4 butane diol was added and mixed in. 300 cc. of the mixture was introduced into a metal mold having a configuration comparable to that shown in FIG. 1 which had been brought to a temperature of 70°C., the closure member was placed over the opening of the mold and the retaining clips were put in place to hold the closure member. The mold was slowly rotated about its longitudinal and transverse axes allowing the liquid emulsion to flow over the total surface of the mold. This rotation was continued for approximately 40 minutes and the mold was then held at 80°C. for 18 hours. The mold was cooled, the closure removed and the cast upper was removed from the mold. The opening for the ankle and the sole portions were cut out leaving an adequate margin for cementing a sole to the upper. The upper was mounted on a form and a synthetic rubber sole was cemented onto the margin by conventional procedure.

Example II

An emulsion was prepared following the procedure set forth in Example I and the liquid flowed into the molding space of a mold such as shown in FIG. 4 using a pressure of 2 lbs. per sq. inch gauge and preheating the mold to 70°C. After filling, the mold was held for 7 hours at 80°C. and was allowed to cool to room temperature during the next 16 hours. At this time the parts of the separable mold were moved to allow removal of the shoe upper on the mold core. The upper was held for 18 hours at 90°C. to evaporate the dispersed liquid paraffinic hydrocarbon and was finally cured at 105°C. A synthetic rubber sole was cemented to the marginal portions at the bottom of the upper and the shoe was dyed black and finished.

A sample molded of the reactive emulsion which was processed, cured and dried under the same conditions as those used in molding of the shoe upper was tested for permeability and was found to have a water vapor permeability of 1.4 grams/30 cm²/24 hours/55 mils.

Example III 150 grams of —NCO terminated prepolymer prepared as in Example I was liquefied and degassed at 100°C. and mixed with 4.5 grams of a polyoxyalkylene ether having an hydroxyl number of 20 which is a solid at 25°C. and the mixture was brought to 70°C. 172 cc. of a liquid paraffinic hydrocarbon mixture (boiling range 346 to 405°F.) was emulsified into the resulting hot mixture. Thereafter, one gram of trimethylolpropane and 8.23 grams of 1,4 butane diol was added and mixed in. 300 cc. of the mixture was introduced into a mold following the procedure of Example II, was solidified, the liquid hydrocarbon was evaporated and the molded article cured as in Example II. Thereafter, a synthetic rubber sole was cemented to marginal portions at the bottom of the upper and the shoe was dyed and finished. A sample molded from the reactive emulsion which was processed, cured and dried under the same conditions was tested for mark resistance under pressure conditions comparable to those exerted by the toe in a sole attaching press and results compared with a sample molded of the reaction emulsion of Examples I and II. It was found that the sample containing the trifunctional material, trimethylolpropane, had approximately ten times the resistance to marking as the composition prepared according to Examples I and II.

In a further test, it was found that the material of this example was insoluble in dimethyl formamide while the material of Examples I and II which did not include the trifunctional material was substantially soluble in the dimethyl formamide.

Having thus described my invention what I claim as new and desire to secure by Letters Patent of the United States is:

1. The process of making a thin water vapor permeable microporous article comprising the steps of providing a liquid polymerizable organic material solidifiable substantially without dimensional change to form a microporous resilient organic polymeric resin, forming said liquid polymerizable organic material as a layer conforming to the walls of a molding cavity including a three dimensionally shaped molding surface complementary to the shape of the article to be produced with the surface of said layer spaced from the molding surface of the cavity generally an even distance from the surface of the cavity, polymerizing and solidifying said liquid material to form a microporous resilient organic polymeric resin and removing the solidified material from engagement with said molding surface, said solidifiable liquid polymerizable organic material comprising a substantially water-free fluid emulsion of fine droplets of a volatile organic liquid as the internal phase in a continuous phase comprising reactive material convertible through reaction to a solidified resilient organic polymeric resin, said reactive material comprising a mixture of an organic compound providing at least two reactive —NCO groups per molecule and an organic compound having at least two active hydrogens per molecule for reaction with said —NCO groups, the liquid of said droplets being substantially non-solvent for and non-reactive with said reactive material and immiscible with said continuous phase and being present in amount of from about 25 percent to about 300 percent by weight based on the weight of the reactive material, reacting said material to solidify it at a temperature below the boiling point of the liquid of said droplets to gel the emulsion and solidify it with said droplets held in the solidified material and removing the liquid of said droplets by evaporation from the solidified material without expanding the solidified material leaving pores and discontinuities in the solidifed material to constitute passageways for air and vapor.

2. The process as defined in claim 1 in which said article is a shoe upper.

3. The process as defined in claim 1 in which said article is a glove.

4. The process of making a microporous shoe upper as defined in claim 2 in which at least 0.5 percent by weight of the combined weights of organic compound having the —NCO groups and organic compound having active hydrogens is made up of at least one organic compound having more than two reactive groups per molecule whereby the material solidified by reaction contains a substantial proportion of cross linking to improve resistance to injury by heat and solvents.

5. The process of making a microporous shoe upper as defined in claim 2 in which a flexible fibrous reinforcing member is held in predetermined relation to said molding surface and is embedded in said layer of solidifiable polymerizable organic liquid material to provide, after solidification of the liquid material, reinforcement at predetermined areas of said shoe upper.

6. The process of making a microporous clothing article as defined in claim 1 in which a pigmented solution or latex of a hydrophilic synthetic polymeric resin is deposited on said molding surface prior to forming said layer of solidifiable polymerizable organic liquid material to provide a desired surface character to said article.

7. The process of making a microporous clothing article as defined in claim 1 in which said solidifiable polymerizable organic liquid is maintained in a desired thickness distribution on said molding surface by rotationally moving said molding surface to cause said liquid to flow under the action of gravity to cover the molding surface.

8. The process of making a microporous article as defined in claim 7 in which said article is a shoe upper, said molding surface is the interior wall of a mold cavity, the quantity of solidifiable polymerizable organic liquid needed to form a layer of the desired thickness is supplied to said cavity and the solidifiable polymerizable organic liquid is distributed on the molding surface by rotationally moving said molding surface about horizontal and vertical axes to cause said liquid to flow to cover the molding surface under the action of gravity.

9. The process of making a microporous clothing article as defined in claim 1 in which said molding surface is the interior wall of a mold cavity, a core is provided in spaced relation to said molding surface to provide a space having the desired thickness of said article between said core and said molding surface and in which said space is filled by said solidifiable polymerizable organic liquid.

10. The process of making a microporous article as defined in claim 9 in which said article is a shoe upper, and said core member is a foreshortening footform mounted in spaced relation to said molding surface to provide a space having the desired thickness of said shoe upper between the core and said molding surface.

11. The process of making a microporous shoe upper as defined in claim 10 in which a fibrous reinforcing member is supported by said core in desired relation to said molding surface.

12. Process of making a microporous shoe upper as defined in claim 11 in which a fibrous reinforcing member is stretched around said core to support it in desired relation to said molding surface.

13. The process of making a microporous shoe upper as defined in claim 2 in which said molding surface is the interior wall of a mold cavity to form a shoe upper with a bottom opening uppermost, a measured quantity of said solidifiable polymerizable organic liquid is introduced into the mold cavity and a core member with an exterior surface corresponding to the desired interior surface of the shoe is pressed down through said bottom opening to displace said liquid up into the space between said core and said molding surface and to bring the exterior surface of the core into a relation providing a distance between the surface of the core and of said molding surface corresponding to the desired thickness of said shoe upper.

14. The process of making a microporous shoe upper as defined in claim 8 in which a pigmented solution or latex of a hydrophilic synthetic polymeric resin is deposited on said molding surface before introduction of said solidifiable liquid into the space between said core and said molding surface to provide a desired surface character to said shoe upper.

15. The process of making a microporous shoe upper as defined in claim 10 in which a layer of a pigmented solution or latex of a hydrophilic synthetic polymeric resin is deposited on said molding surface before introduction of said solidifiable polymerizable organic liquid into the space between said core and said molding surface to provide a desired surface character to said shoe upper.

16. The integral microporous water vapor permeable article formed by the process of claim 1.

17. The integral microporous water vapor permeable shoe upper including a flexible fibrous reinforcing member formed by the process of claim 5.

18. The integral microporous water vapor permeable shoe upper including an integral surface finish of pigmented hydrophilic synthetic polymeric resin united to the main body of microporous material formed by the process of claim 15.

* * * * *